US008855806B2

(12) United States Patent
Hara et al.

(10) Patent No.: US 8,855,806 B2
(45) Date of Patent: Oct. 7, 2014

(54) MANAGING SHIPMENT RELEASE FROM A STORAGE AREA TO A PACKING STATION IN A MATERIALS HANDLING FACILITY

(75) Inventors: Yusuke Hara, Tokyo (JP); Natalie T. Nguyen, Seattle, WA (US); Christopher David Rotella, Seattle, WA (US); Cherie G. Wong, Seattle, WA (US); Arlen R. Dean, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 467 days.

(21) Appl. No.: 12/788,124

(22) Filed: May 26, 2010

(65) Prior Publication Data

US 2011/0295412 A1 Dec. 1, 2011

(51) Int. Cl.
*G06Q 10/08* (2012.01)
*G06Q 30/00* (2012.01)

(52) U.S. Cl.
CPC ..................................... *G06Q 10/08* (2013.01)
USPC ........................................................ 700/216

(58) Field of Classification Search
CPC ..................................................... G06Q 10/00
USPC ..................................................... 705/7, 216
See application file for complete search history.

(56) References Cited

U.S. PATENT DOCUMENTS

| | | | | |
|---|---|---|---|---|
| 5,267,638 | A | * | 12/1993 | Doane ............................ 198/357 |
| 5,395,206 | A | * | 3/1995 | Cerny, Jr. ....................... 414/807 |
| 5,666,493 | A | * | 9/1997 | Wojcik et al. .................... 705/22 |
| 5,712,989 | A |  | 1/1998 | Johnson et al. |
| 5,720,157 | A | * | 2/1998 | Ross ................................ 53/445 |
| 6,182,053 | B1 |  | 1/2001 | Rauber et al. |
| 6,286,292 | B1 | * | 9/2001 | Spatafora et al. ................ 53/492 |
| 6,289,260 | B1 | * | 9/2001 | Bradley et al. ................. 700/216 |
| 6,505,093 | B1 | * | 1/2003 | Thatcher et al. ............... 700/216 |
| 6,622,127 | B1 | * | 9/2003 | Klots et al. ...................... 705/28 |
| 7,139,637 | B1 | * | 11/2006 | Waddington et al. .......... 700/216 |
| 7,499,766 | B2 | * | 3/2009 | Knight et al. .................. 700/107 |
| 7,979,359 | B1 | * | 7/2011 | Young et al. ................... 705/332 |

(Continued)

FOREIGN PATENT DOCUMENTS

WO    WO 2006017602 A1 *   2/2006   .............. B65B 55/20

OTHER PUBLICATIONS

Koster, Le-Duc, Zaerpour, Determining the number of zones in a pick and sort order picking system, Nov. 15, 2011,¶757-771.*

*Primary Examiner* — Justin M Pats
*Assistant Examiner* — Venay Puri
(74) *Attorney, Agent, or Firm* — Robert C. Kowert; Meyertons, Hood, Kivlin, Kowert & Goetzel, P.C.

(57) ABSTRACT

Various embodiments of a system and method for managing shipment release from a storage area in a materials handling facility are described. Embodiments may include a system configured to identify multiple shipments that each includes one or more units that are eligible to be conveyed from a storage area to a respective packing station in a materials handling facility. The identification of a given shipment may include determining that shipment is compatible with a packing capability of the packing station. The system may be configured to evaluate each respective shipment according to one or more shipment-related criteria to generate a ranking of at least some of the multiple shipments. The system may, in response to determining that a particular shipment is ranked highest relative to other shipments of the ranking, generate an instruction to convey the units of that particular shipment from the storage area to the respective packing station.

33 Claims, 8 Drawing Sheets

(56) References Cited

U.S. PATENT DOCUMENTS

| | | | |
|---|---|---|---|
| 8,061,506 B2* | 11/2011 | Schafer | 198/444 |
| 8,408,380 B2* | 4/2013 | Doane | 198/460.1 |
| 2002/0049622 A1* | 4/2002 | Lettich et al. | 705/7 |
| 2002/0188530 A1* | 12/2002 | Wojcik et al. | 705/28 |
| 2004/0028777 A1 | 2/2004 | Koke et al. | |
| 2004/0153187 A1* | 8/2004 | Knight et al. | 700/99 |
| 2005/0055286 A1* | 3/2005 | Zimet | 705/28 |
| 2005/0102203 A1* | 5/2005 | Keong | 705/28 |
| 2005/0209732 A1* | 9/2005 | Audimoolam et al. | 700/216 |
| 2006/0206235 A1 | 9/2006 | Shakes et al. | |
| 2007/0021863 A1 | 1/2007 | Mountz et al. | |
| 2007/0043468 A1* | 2/2007 | Schaefer et al. | 700/216 |
| 2007/0233300 A1* | 10/2007 | Jones | 700/99 |
| 2007/0283590 A1* | 12/2007 | White et al. | 33/763 |
| 2008/0167884 A1* | 7/2008 | Mountz et al. | 705/1 |
| 2009/0099678 A1* | 4/2009 | Kurata et al. | 700/106 |
| 2009/0112675 A1* | 4/2009 | Servais | 705/8 |
| 2009/0136333 A1* | 5/2009 | Schafer | 414/807 |
| 2009/0143887 A1* | 6/2009 | Jones | 700/99 |
| 2009/0287330 A1* | 11/2009 | Overley et al. | 700/96 |
| 2009/0288996 A1* | 11/2009 | Shafer | 209/546 |
| 2010/0114790 A1* | 5/2010 | Strimling et al. | 705/330 |
| 2010/0125494 A1* | 5/2010 | Boss et al. | 705/14.19 |
| 2011/0295413 A1* | 12/2011 | Hara et al. | 700/216 |

\* cited by examiner

MANAGING SHIPMENT RELEASE FROM A STORAGE AREA TO A PACKING STATION IN A MATERIALS HANDLING FACILITY

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may operate a facility that prepares shipments of purchased items. A shipment carrier may acquire such shipments from the merchant and deliver the shipments to the respective purchasing customers.

The facilities operated by the merchant may include various fulfillment processes for fulfilling orders submitted by customers. These processes may operate on items to perform various tasks, such as preparing items for shipment. Inefficiencies in one or more of these processes may impact the overall efficiency or throughput of the entire facility. Furthermore, some resources used to carry out these processes may have fixed capacities. Inefficiently using such resources may result in the needless expenditure of capital to expand resource capacity.

While the system and method for managing shipment release from a storage area in a materials handling facility is described herein by way of example for several embodiments and illustrative drawings, those skilled in the art will recognize that the system and method for managing shipment release from a storage area in a materials handling facility is not limited to the embodiments or drawings described. It should be understood, that the drawings and detailed description thereto are not intended to limit the system and method for managing shipment release from a storage area in a materials handling facility to the particular form disclosed, but on the contrary, the intention is to cover all modifications, equivalents and alternatives falling within the spirit and scope of the system and method for managing shipment release from a storage area in a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
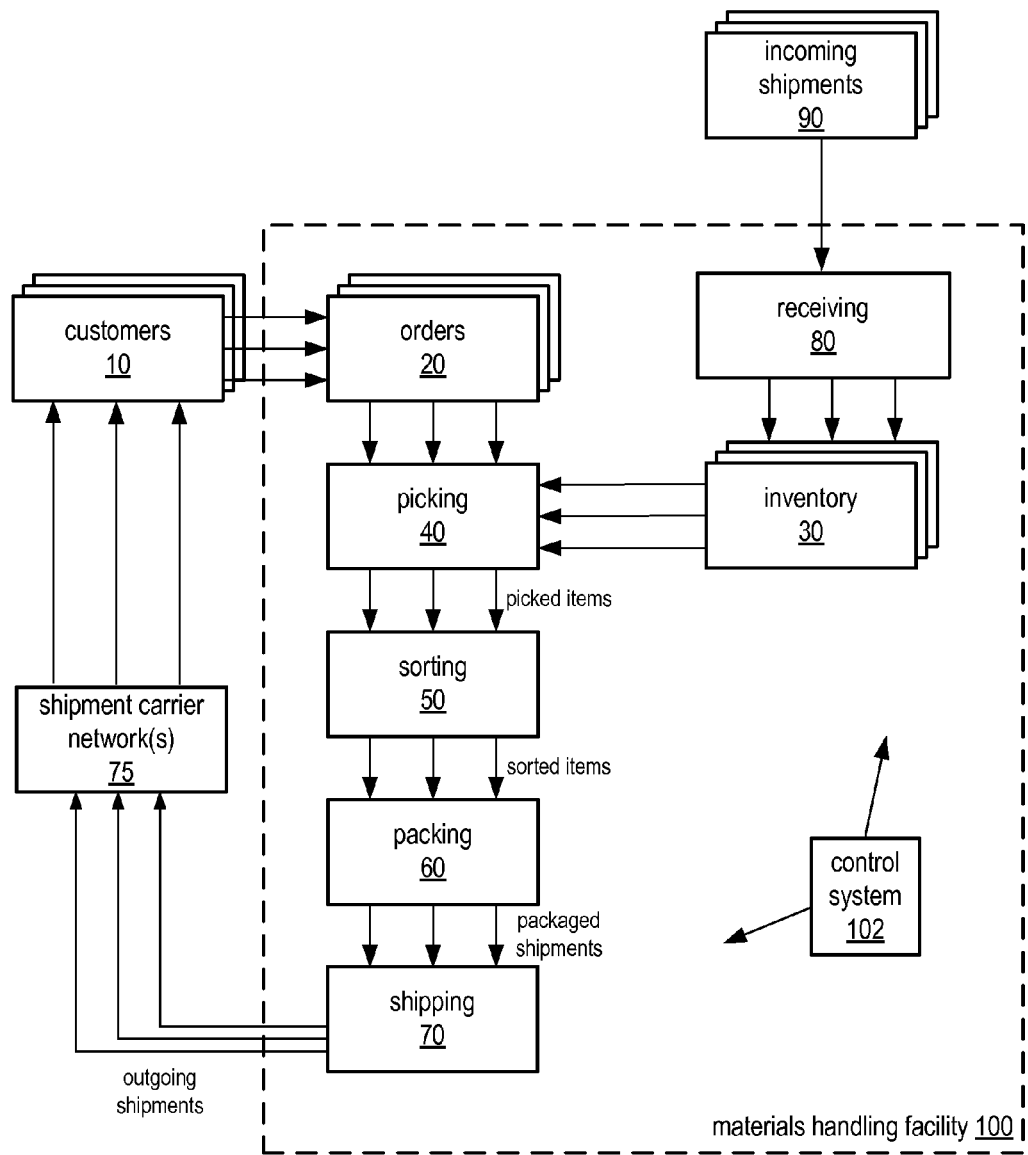
FIG. 1 illustrates a logical representation of the operations of a materials handling facility, according to some embodiments.

Various embodiments of a system and method for managing shipment release from a storage area in a materials handling facility are described. FIG. 1 illustrates a logical representation or view of the operation of a materials handling facility 100 of various embodiments of the system and method for managing shipment release from a storage area in a materials handling facility. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor through an e-commerce portal or other electronic marketplace, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 70 may be transferred to one or more shipment carrier network(s) 75. Each shipment carrier's network may include one or more distribution facilities for storing items as well as vehicles for conveying shipments from such distribution facilities and/or materials handling facilities (such as materials handling facility 100) to various destinations (e.g., customer specified destinations).

Figure 2:
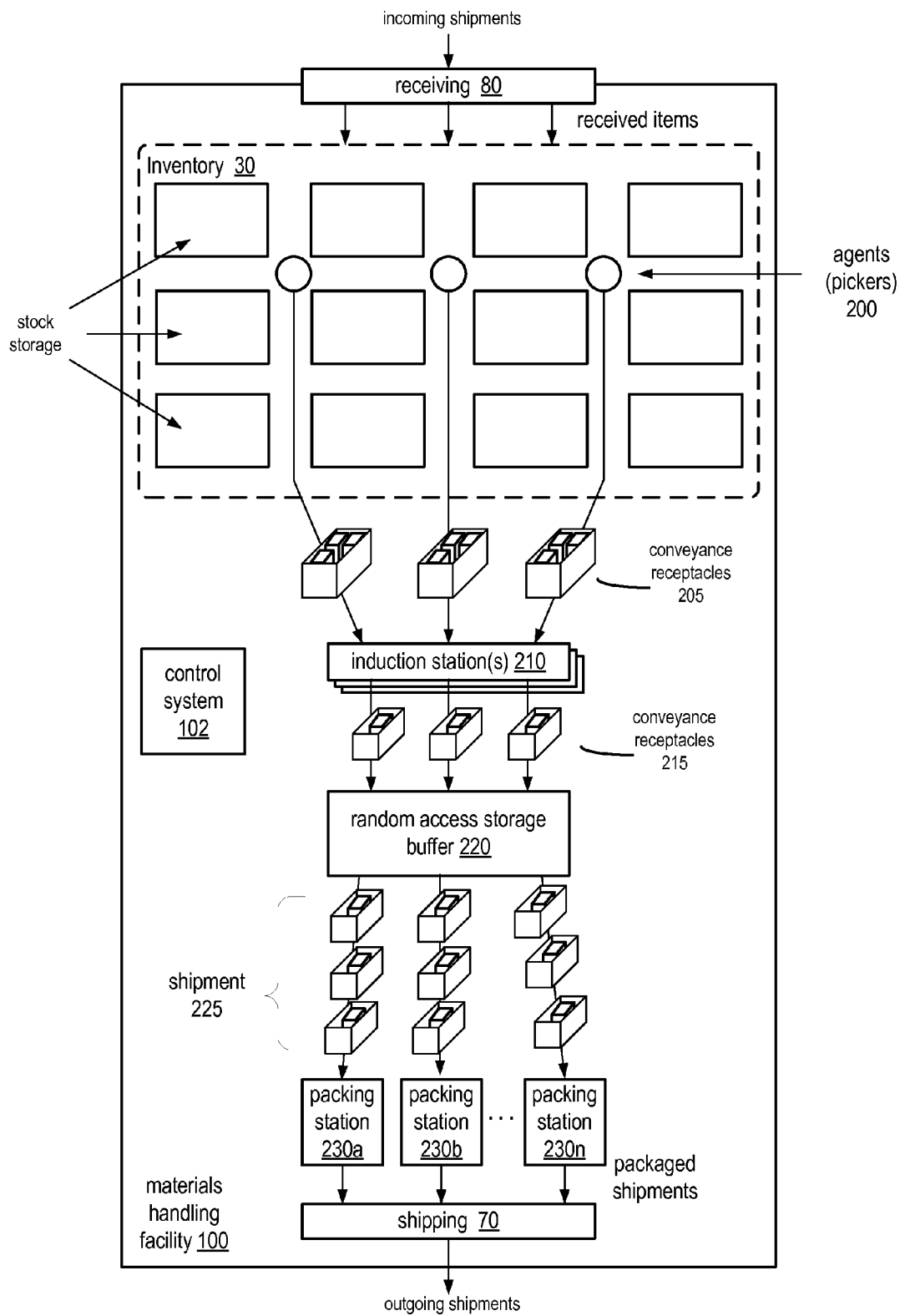
FIG. 2 illustrates an example physical layout for a materials handling facility, according to some embodiments.

FIG. 2 illustrates an exemplary physical layout of a materials handling facility, such as an order fulfillment facility or center, in which embodiments of the system and method for managing shipment release from a storage area in a materials handling facility are implemented. Requests (e.g., orders) for items from requestors may be divided among multiple pickers 200, who then pick items from inventory storage 30. Picked units of items may be placed into conveyance receptacles 205 (e.g., totes or carts) for conveyance. The orders may be subdivided among the pickers 200; therefore, two or more of the pickers 200 may pick items for one order. The picked items may be conveyed to an induction station 210 or stations (there may be more than one induction station 210). For example, the picked items in conveyance receptacles 205 (e.g., totes) each containing one or more units of items (each possibly containing items from two or more orders) may be conveyed to any of inductions stations 210 on a conveyance device (e.g., a conveyor belt).

At the induction station 210, each unit may be pulled individually from each conveyance receptacle 205. Alternatively, all items may be "dumped" into a common receptacle (a bin, basket, shelf, etc.), and individual units may then be pulled from the common receptacle. In various embodiments, each pulled unit is then placed into a conveyance receptacle 215 (e.g., a tote or tray) by itself. This process may be referred to as singulating the item. Receptacles, as used herein, may include, but are not limited to, any tote, basket, box, tray, or similar mechanism configured to receive individual units of items or groups of units of items in a materials handling facility. The conveyance receptacle 215 need not be fixed to any conveyance mechanism.

The pulled unit of an item may be associated with the particular conveyance receptacle 215 it is placed in. In one embodiment, the association of a unit of an item with a particular conveyance receptacle 215 may be performed by reading, scanning or otherwise entering an item identifier associated with the item and a conveyance receptacle identifier associated with the particular conveyance receptacle 215 into which the unit is placed. The item identifier and receptacle identifier may be communicated to a control system 102 of the materials handling facility via wired and/or wireless communications. Each conveyance receptacle 215 may include a unique conveyance receptacle identifier that uniquely identifies the particular conveyance receptacle 215 in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle 215.

Each unit of each item carried in inventory 30 may include an item identifier. A type of item held in inventory 30 may be referred to herein as simply an item. The term item identifier may refer to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual units within a type of item.

Cases, boxes, bundles, or other collections of units of items may similarly be marked or tagged with item identifiers. The units of items in a collection may all be of the same type of item, for example a case of twelve units of a particular item, or may be a collection of one or more units of each of two or more heterogeneous items. A collection of units of item(s) (e.g., a case containing twelve units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, various, in addition to sorting individual units of items, may also process collections of units of item(s) designated as units. Therefore, the conveyance receptacles described herein may receive collections of units of item(s) that are designated as units as well as individual units of items.

Figure 8:
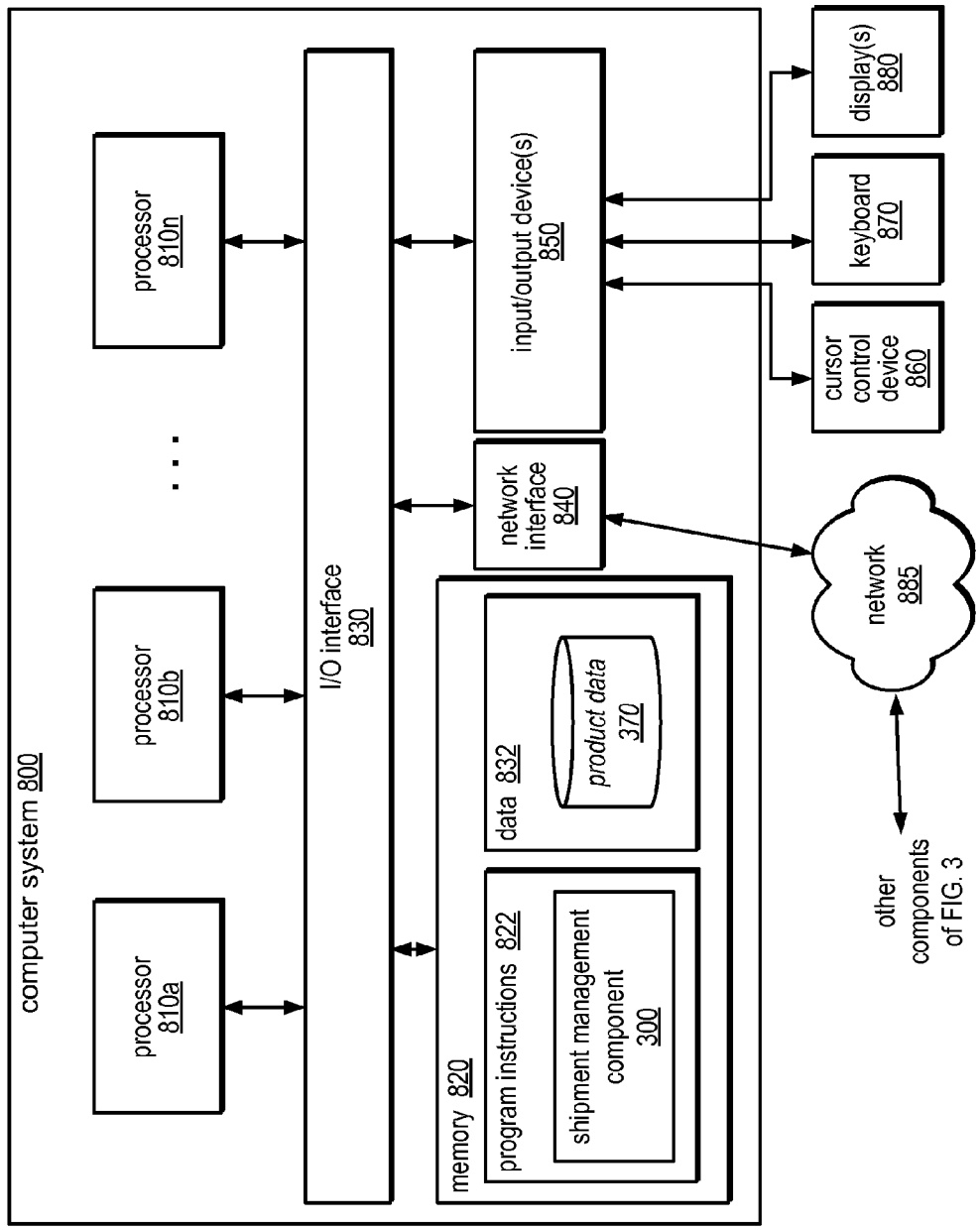
FIG. 8 illustrates one example of a computer system suitable for implementing various elements of the system and method for managing shipment release from a storage area in a materials handling facility, according to some embodiments.

A materials handling facility may include a control system 102 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 102 is illustrated in FIG. 8.

At the induction station 210, a pulled unit of an item may be associated with a particular conveyance receptacle 215 by reading, scanning, etc. the item identifier associated with the item and the conveyance receptacle identifier associated with the conveyance receptacle 215 into the control system 102. This may be performed manually (e.g., by an operator or agent using a hand-held scanner), via an automated scanning/reading process using fixed scanners/readers, or by a combination of manual and automatic scanning/reading. For example, an operator at the induction station 210 may use a hand-held scanner to scan a code off the unit of the item before or during placement of the unit into a "staged" conveyance receptacle 215, while an automated reader may read (or may have already read) the conveyance receptacle identifier from the conveyance receptacle 215 that is "staged" for the operator to place the unit of the item into.

Once a pulled unit of an item is associated with and placed into a particular conveyance receptacle 215, the conveyance receptacle 215 may be inducted into a conveyance mechanism (e.g., a conveyor belt, roller system, or other conveyance mechanism) to be conveyed to random access storage buffer 220. In various embodiments, the conveyance mechanism may include a mechanism that includes some method of diverting a product off a conveyance path under control of the control system. Examples of such diversion mechanisms may include, but are not limited to, sliding shoe sorter mechanisms and pop up diversion mechanisms, such as pop up wheel sorter mechanisms. A pop up wheel sorter includes powered wheels that rise up out of the conveyor to divert product off the conveyor onto a different path or to a location. Other types of mechanisms may be used in various embodiments.

The conveyance receptacle 215 may already be on the conveyance mechanism when the unit is associated with and placed into the receptacle 215. Alternatively, a conveyance receptacle 215 may be retrieved from a conveyance receptacle storage, stack, or other supply, the unit may be associated with and placed into the receptacle 215, and the receptacle 215 may then be inducted into or placed on the conveyance mechanism. The conveyance receptacles 215 need not be fixed to the conveyance mechanism; instead, the receptacles 215 may be removable bins, trays, totes, or similar devices. The conveyance mechanism may be coupled to and controlled by the materials handling facility control system 102 via wired and/or wireless communications. The control system 102 may receive input from and send commands to the conveyance mechanism to direct or control various operations of the conveyance mechanism.

The above describes aspects of an induction station 210 in which a human operator performs at least a portion of the pulling of units of items from groups of picked items, scanning/reading the items and receptacles 215 to associate single units of items to particular conveyance receptacles 215, and placing the units into the conveyance receptacles 215. In alternative embodiments, some or all of the activities described as being performed by a human operator may be performed by automated mechanisms, which may be coupled to and under control of the materials handling facility control system 102.

Inducted items stored in conveyance receptacles 215 may be delivered to a random access storage buffer 220. Random access storage buffer 220 may in various embodiments be configured to store multiple conveyance receptacles (each including a unit of an item) in respective buffer locations. In some embodiments, random access storage buffer 220 may include shelving units or other physical structures with columns and rows defining addressable locations or "slots" in which one or more conveyance receptacles 215 may be stored. In some embodiments, random access storage buffer may include automated or robotic mechanisms (e.g., multi-directional lifts or elevators) that may acquire an inducted conveyance receptacle 215 and place such receptacle into a respective addressable location of the random access storage buffer. Similar mechanisms may be utilized to remove conveyance receptacles (each including an item) from random access storage buffer 220. In various embodiments, random access storage buffer may be a two-sided structure such that conveyance receptacles may be placed into addressable locations of the buffer from one side of the buffer (e.g., an ingress side) and removed from another side of the buffer (e.g., an egress side).

Note that a conveyance receptacle including an item may be stored within random access storage buffer 220 for varying quantities of time (e.g., relatively short or relatively long periods of time). In some cases, conveyance receptacles that include units of the same shipment may arrive at the random access storage buffer at different times (e.g., due to picking variabilities). In some embodiments, conveyance receptacles including such units (typically one unit per receptacle) may not be eligible to be removed or "released" from the random access storage buffer until all of such units are present within the buffer. Shipments eligible for release may be removed from random access storage buffer 220 when directed by a computer system managing the buffer.

In various embodiments, random access storage buffer 220 may be controlled by control system 102 or by a dedicated buffer management component. In various embodiments, the buffer management component may control any and/or all aspects of the random access storage buffer 220, including but not limited to the physical mechanisms (e.g., robotic arms, lifts, elevators, etc.) that control the ingress and egress of conveyance receptacles 215 into and out of random access storage buffer 220. One example of such a buffer management component is described below with respect to buffer management component 360.

In various embodiments, units may be released from random access storage buffer 220 and provided to a respective one of packing stations 230a-230n (collectively referred to as packing stations 230) on a per shipment basis. For instance, the conveyance receptacles including units that makeup shipment 225 may be released from random access storage buffer 220 and provided to packing station 230a. In various embodiments, each packing station may be configured to request one or more shipments depending on a measure of that packing stations current workload.

At each packing station, shipments of items (e.g., shipment 225) may be packed into a respective shipping container (e.g., corrugated box or other shipping container) for shipment from the materials handling facility. Prepared shipments may be processed at shipping 70 and conveyed to a shipment carrier for delivery to respective customers.

The illustrated materials handling facility also includes multiple unit handling processes. Generally, any process that moves a unit from a location within the materials handling facility to another location may be considered a unit handling process. For example, picking units of items from inventory 30 to conveyance receptacles 205 may be a unit handling process. The movement of conveyance receptacles 205 to induction stations 210 may also be a unit handling process. Likewise the conveyance of receptacles 215 from inductions stations 210 to random access storage buffer 220 may be a unit handling process. The release of shipments from random access storage buffer 220 to packing stations 230 may also be a unit handling process. In various embodiments, each of these unit handling processes may have a respective throughput rate (e.g., units per hour).

Various embodiments of the system and method for managing shipment release from a storage area in a materials handling facility may control one or more of the unit handling processes to efficiently utilize resources of the materials handling facility without exceeding known constraints of the materials handling facility. This may in some cases include managing the throughput rate of one or more of the unit handling processes. Examples of constraints may include the unit capacity of induction stations 210 or random access storage buffer 220, for example.

Embodiments may include elements for managing the release of shipments from a storage area (e.g., random access storage buffer 220) to one or more packing stations (e.g., packing stations 230). This process may include, for a given packing station that needs work, selecting a shipment to release from the random access storage buffer 220. For instance, a priority ranking of shipments eligible to be released may be generated. The shipment (e.g., a group of units belonging to the same shipment) that is ranked highest in this priority ranking may be selected for release to the packing station. This priority ranking may be generated based on a variety of criteria, such as an expected shipping deadline for a shipment. This process is described in more detail below with respect to subsequent figures. Embodiments may also include elements for controlling the order in which units of a given shipment are released and/or arrive at a respective packing station. (Note that, due to the manner in which buffer 220 handles units in some embodiments, the order in which units are released from the random access storage buffer may be, but need not be, the same as the order in which those same units arrive at a respective packing station.) In various embodiments, this order may be based on the physical dimensions of the units within a shipment. For instance, in one embodiment, a footprint may be based on the two largest dimensions of each unit (e.g., the result of multiplying product length by product width). In this example, units may be provided to a packing station in a descending order based on footprint size (e.g., largest footprint unit is provided first, second-largest is provided second, and so on). Providing units to packing stations in this manner may accelerate the packing process, as described in more detail below.

Figure 3:
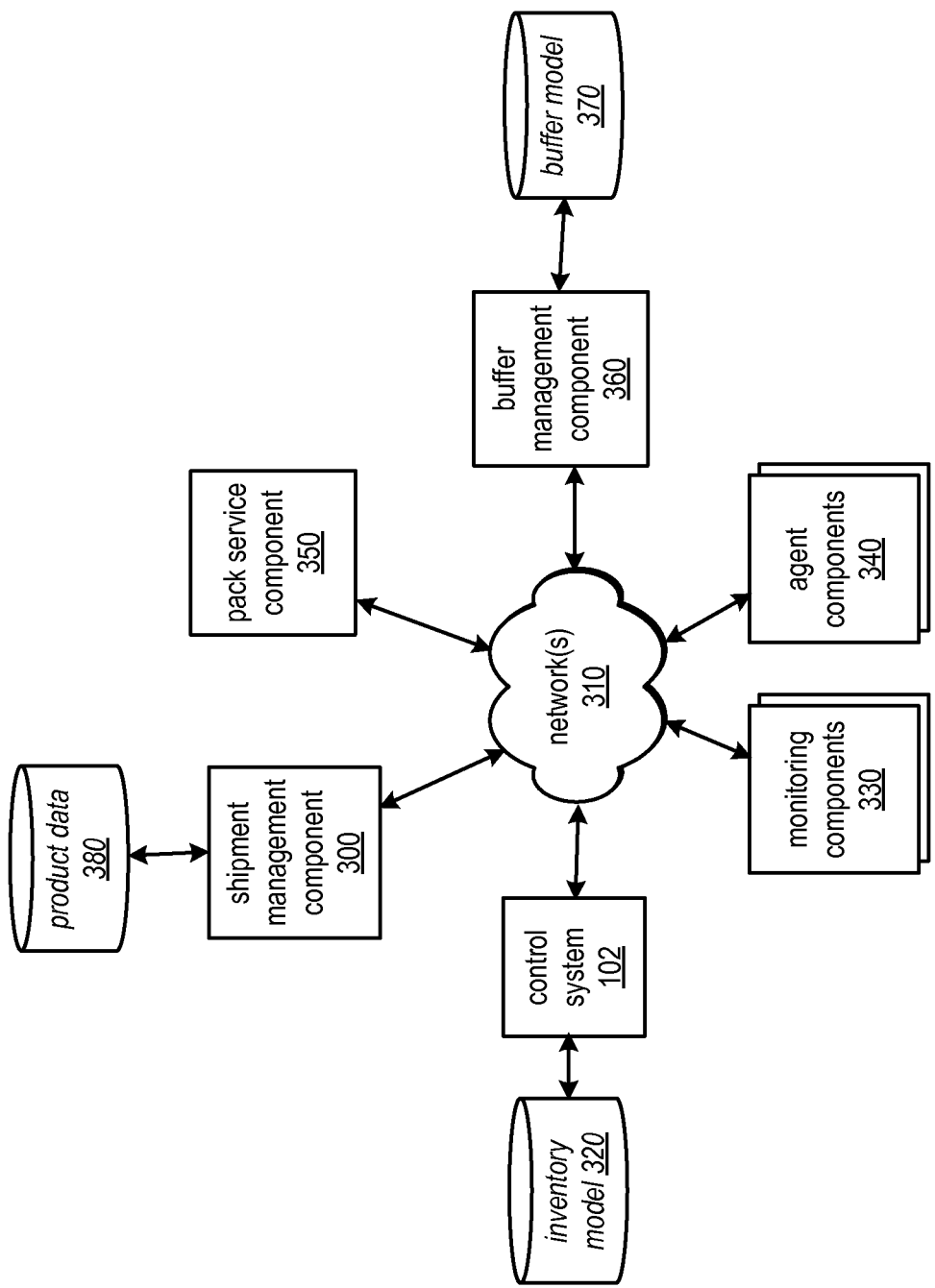
FIG. 3 illustrates an example system configuration including a shipment management component, according to some embodiments.

In various embodiments, the above-describe aspects of controlling the release of shipments as well as the order in which units of a given shipment are provided to a pack station may be controlled by a shipment management component. FIG. 3 illustrates an example system configuration that includes such a shipment management component, which is illustrated as shipment management component 300. In the illustrated embodiment of FIG. 3, any of the illustrated components may be implemented on one or more computer systems, such as the computer system of FIG. 8. Additionally, any of the illustrated components may communicate over one or more network(s) 310, which may be configured similar to the network 885 of FIG. 8.

Control system 102 may be the same as that illustrated in previous figures. In various embodiments, control system 102 may be configured to create, maintain, and/or update an inventory model 320. Inventory model 320 may indicate a real-time or near real-time representation of the location of inventory units with the materials handling facility. Note that the location of a given unit need not be limited to inventory 30. For instance, the location of a unit could be a conveyance receptacle, the location of that conveyance receptacle within the materials handling facility, a conveyance system, random access storage buffer 220, or any other location of the materials handling facility. In various embodiments, as agents handle units throughout the materials handling facility, agent components 340 may scan items into and out of various locations. For instance, agent components 340 may be mobile and/or handheld devices utilized by agents to record the location of units during handling. The agent components may be configured with bar code or RFID scanners in order to read unit identifiers, conveyance receptacle identifiers, and/or location identifiers (e.g., an identifier of a location in inventory, a pack station, etc.). Unit identifiers and/or location identifiers may be sent from agent components 340 to control system 102. Control system 102 may store records that associate a unit with a respective location in inventory model 320. Monitoring components 330 may provide similar information to control system 102. For example, monitoring components may be automated scanners or receivers that track the units within the materials handling facility, in some cases in an automated manner. For instance, monitoring components may represent optical scanners or RFID scanners that are strategically placed within the materials handling facility. The control system may be configured to update the inventory model 320 based on information received from such monitoring components, according to various embodiments.

As described above, shipment management component 300 may be configured to, for a given packing station that needs work, select a shipment to release from the random access storage buffer 220, which may be based on a priority ranking of shipments eligible to be released to that pack station. In various embodiments, shipment management component 300 may also be configured to, for a given shipment that is released, control the order in which the units of that shipment are provided to the respective packing station. In various embodiments, this order may be based on various criteria, such as the physical dimensions of a unit. Product data 380 may, for any unit of the materials handling facility, store corresponding product data that may include but is not limited to dimension information of a unit (e.g., length, width, depth), weight of a unit, measures of fragility (e.g., very fragile, slightly fragile, not fragile, durable, etc.) or any other information pertaining to the units within the materials handling facility. This information may be utilized by shipment management component 300 to generate the order according to which a shipment is provided to a respective pack station.

Embodiments may also include a pack service component 350. Pack service component 350 may maintain records of pack station packing capabilities (or simply "capabilities") and provide this information to other components (e.g., shipment management component 300) when needed. As described in more detail below, when shipment management component 300 is determining which shipments to release from buffer 220 to a particular pack station, pack service component 350 may provide the shipment management component with information that specifies the capabilities of that pack station. For example, in some embodiments, different types of packing stations 230 may have different processing capabilities. For instance, one packing station may process only small shipments whereas other packing stations may process only medium or only large shipments. In some cases, some packing stations may process some combination of shipment types, such as a combination of small and medium or a combination of medium and large shipments. Of course, other shipment size granularities may be specified in other embodiments (e.g., extra-small, extra-large, etc.). In various embodiments, these shipment types may generally correspond to the volumetric displacement of a shipment (e.g., a collection of units) and not necessarily the size of the units individually. For instance, a large shipment may be comprised of many small units or comprised of one large unit. Shipment management component 300 may utilize the above-described information to constrain the universe or domain of shipments being considered for release. This process is described in more detail below with respect to FIG. 5.

Buffer management component 360 may be configured to control random access storage buffer 220. In various embodiments, buffer management component 360 may control any and/or all aspects of the random access storage buffer 220, including but not limited to the physical mechanisms (e.g., robotic arms, lifts, elevators, etc.) that control the ingress and egress of conveyance receptacles 215 (including respective units) into and out of random access storage buffer 220. Buffer management component 360 may also be configured to generate, maintain and/or update a buffer model 370. In various embodiments, buffer model 370 may be configured to specify information that indicates, for each receptacle received by the random access storage buffer, the location of that receptacle as well as various metadata about the receptacle. In various embodiments, this metadata may specify a shipment identifier (or simply "shipment ID") of the shipment to which the conveyance receptacle is associated. For instance, for a shipment of three units stored in the random access storage buffer, each respective conveyance receptacle (e.g., tray) storing one of such units may be associated together by a common shipment identifier in the buffer model 370. In this way, when shipment management component sends a shipment release request (specifying a shipment ID) to buffer management component 360, buffer management component may evaluate the metadata to determine the trays that are associated with that shipment ID and release those trays. In various embodiments, for a given shipment ID, buffer model 370 may also specify the order in which those trays are to be provided to a pack station. As described in more detail with respect to FIG. 4A, this order may be generated and provided by shipment management component 300. In various embodiments, this may occur at the time of unit induction into the random access storage buffer.

Figures 4A, 4B:
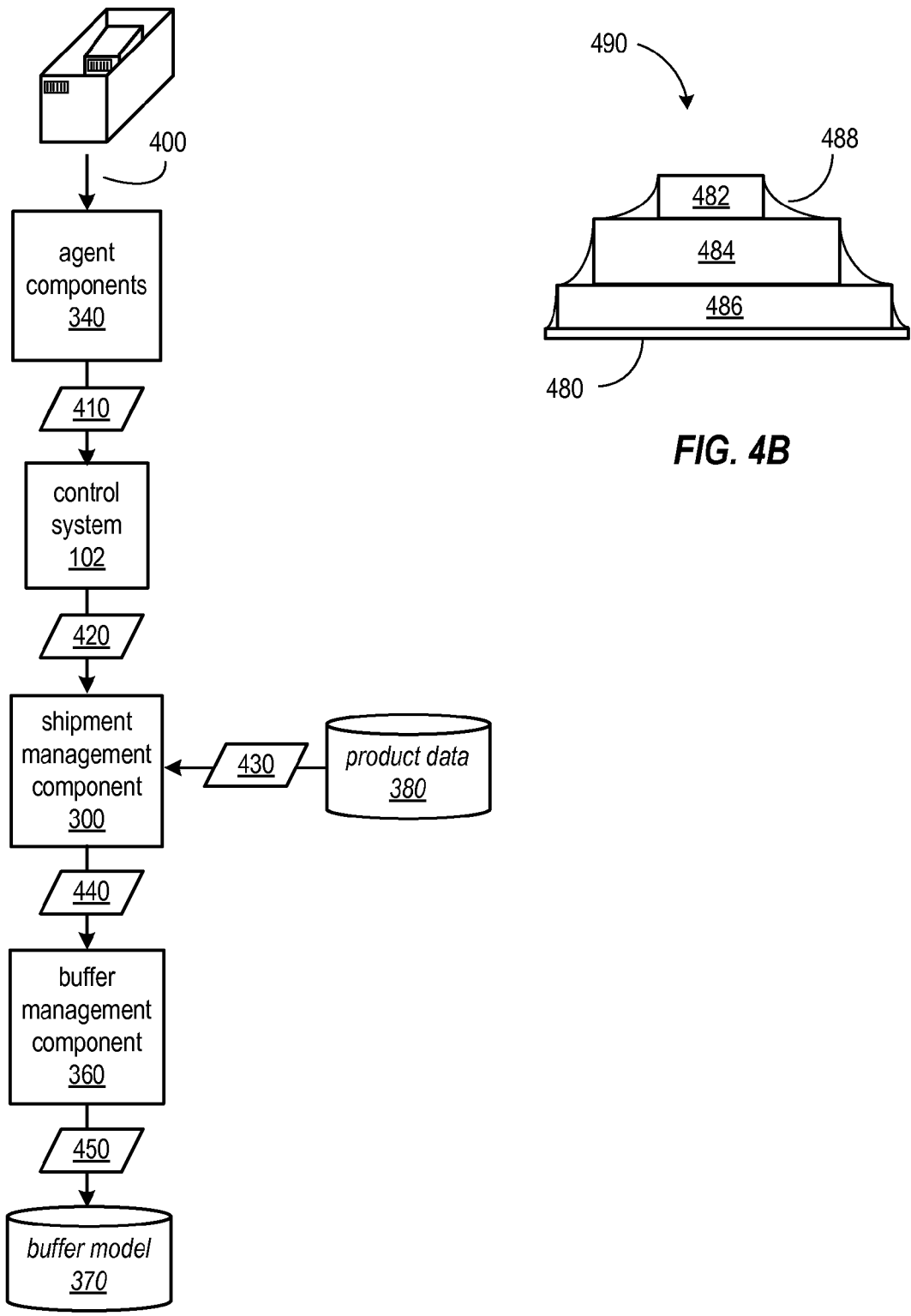
FIG. 4A illustrates an example flow diagram of the generation of a release order, according to some embodiments.
FIG. 4B illustrates an example product unit, according to some embodiments.

FIG. 4A illustrates a data flow diagram of an example process for determining an order according to which units of a particular shipment are to be released. This order may be referred to herein as a "release order" but generally refers to the order according to which units of a shipment are to be provided to a pack station. At 400 of the illustrated embodiment, a unit in a conveyance receptacle (e.g., a conveyance receptacle 215) may be inducted into random access storage buffer 220. At this time, an agent component 340 (or alternatively a monitoring component 330) may scan the identifier of the unit and the conveyance receptacle in which the unit is located. These identifiers may be provided to control system 102, as illustrated by data 410. At 420, shipment management component 300 may be notified that the unit/receptacle pair have been inducted (or are being inducted). If the unit is a part of a multiunit shipment for which other units have already been inducted or will be inducted, shipment management component may be configured to generate a release order for that shipment.

In various embodiments, the shipment management component may generate the release order based on one or more criteria related to physical characteristics of each unit. For example, in various embodiments, units with the largest footprint (relative to other units of the same shipment) may be the first to be provided to a pack station upon release of that shipment. In various embodiments, the footprint of a given unit may be the result of multiplying the largest dimension of the unit (e.g., the length of the unit) with the second largest dimension of the unit (e.g., the width of the unit). In various embodiments, the footprint may be generated according to other techniques and/or other criteria. In various embodiments, the criteria by which units of a shipment are evaluated to determine a release order may include but are not limited to the length of each respective unit, the width of each respective unit, the depth of each respective unit, the surface area of each respective unit, the volume of each respective unit, the weight of each respective unit, and/or a measure of fragility of each respective unit (e.g., less fragile units are provided to pack stations first). Any of this information may be stored within product data 380, which is accessible to shipment management component 300.

In one example, the shipment management component may, for each unit of a shipment, multiply the length of that unit by the width of that unit to determine a footprint value (e.g., an area). The shipment management component may be configured to generate the release order such that the order indicates the units of the shipment are to be provided to the respective packing station in order of descending footprint value (e.g., largest area provided first, second largest area provided second, and so on). In various embodiments, the length of a given unit may be the largest dimension of that unit relative to other dimensions of that unit. The width of a given unit may be the second largest dimension of that unit relative to other dimensions of that unit. In one non-limiting example, the length of a unit may be the largest dimension, the width may be the second largest dimension, and the depth may be the smallest dimension.

Referring collectively to FIGS. 4A and 4B, a shrink-wrapped "product unit" 490 is provided for illustrative purposes. This product unit may be assembled at a pack station 230 and/or one or more subsequent stations (e.g., a shrink-wrapping station). In this figure, the product unit may be made up of three inventory units 482, 484 and 486. As illustrated, unit 486 may have the largest footprint of the three units, unit 484 may have the second largest footprint of the three units, and unit 482 may have the smallest footprint of the three units. In various embodiments, agents at pack stations 230 may take a bottom-up approach to preparing a product unit 490. For instance, support member 480 (e.g., a corrugated cardboard plane) may be positioned into place first. Next, item 486 may be placed on top of the support member. Item 484 may then be placed on top of item 486. Item 482 may then be placed on top of item 484. This may be done by the agent or by an automated machine or mechanism. In various embodiments, the agent at the packing station or at some downstream station may wrap the support member and units positioned thereon in a plastic shrink-wrap 488 or otherwise secure support member 480 and units 482-486 together. By providing the illustrated units to the pack station according to a release order of largest footprint to smallest footprint (e.g., unit 486, then unit 484, then unit 482), embodiments may alleviate pack station agents from the burden of rearranging the units into the appropriate order at packing time.

In various embodiments, any of the criteria described above may be utilized to generate the release order. For instance, in one embodiment, the shipment management component may bias the criteria such that heavier units are placed toward the bottom of a product unit 490 (e.g., heavier units are provided to the pack station before lighter units). In another example, the shipment management component may bias the criteria such that less fragile units are placed toward the bottom of a product unit 490 (e.g., units that are more durable arrive at the pack station before items that are less durable). In general, any of the criteria described above may be utilized to generate the release order. Any of the relevant product information for the above-described may be retrieved from product data 380, as illustrated by the retrieval of data 430.

Shipment management component 300 may provide the generated release order and corresponding shipment ID to buffer management component 360 as illustrated by data 440. Data 440 may also specify the identifiers of the inducted conveyance receptacle and unit within that conveyance receptacle. The buffer management component 360 may store any of this information within buffer model 370, as illustrated by data 450. In one example, for each unit inducted into random access storage buffer 220, buffer model 370 may specify the corresponding shipment ID and the order in which that unit is to be provided to a pack station at release time. For instance, in a shipment of three units, the unit with the largest footprint may be specified within the buffer model as "1st of 3." The shipment with the second largest footprint may be specified as "2nd of 3" and so on. In various embodiments, when a request to release a particular shipment is received by the buffer management component, as described below with respect to FIG. 5, the shipment may be provided to the respective packing station according to the release order associated with the shipment ID of that shipment in buffer model 370.

In some embodiments, the release order described herein may be expressed as a ranking of units within a given shipment. The ranking may specify a release priority for each unit relative to other units of that shipment. In one non-limiting example, a unit with a release priority of "one" may be expected to be provided to a packing station before a unit with a release priority of "two." In some cases, the ranking of a given unit need not be unique with respect to the ranking of other units. For instance, multiple units may have the same ranking in some cases. In one non-limiting example, two equivalently ranked units may be provided to a pack station in any order with respect to each other as long as both units are provided to that pack station before other lower-ranked units of the same shipment.

Figure 5:
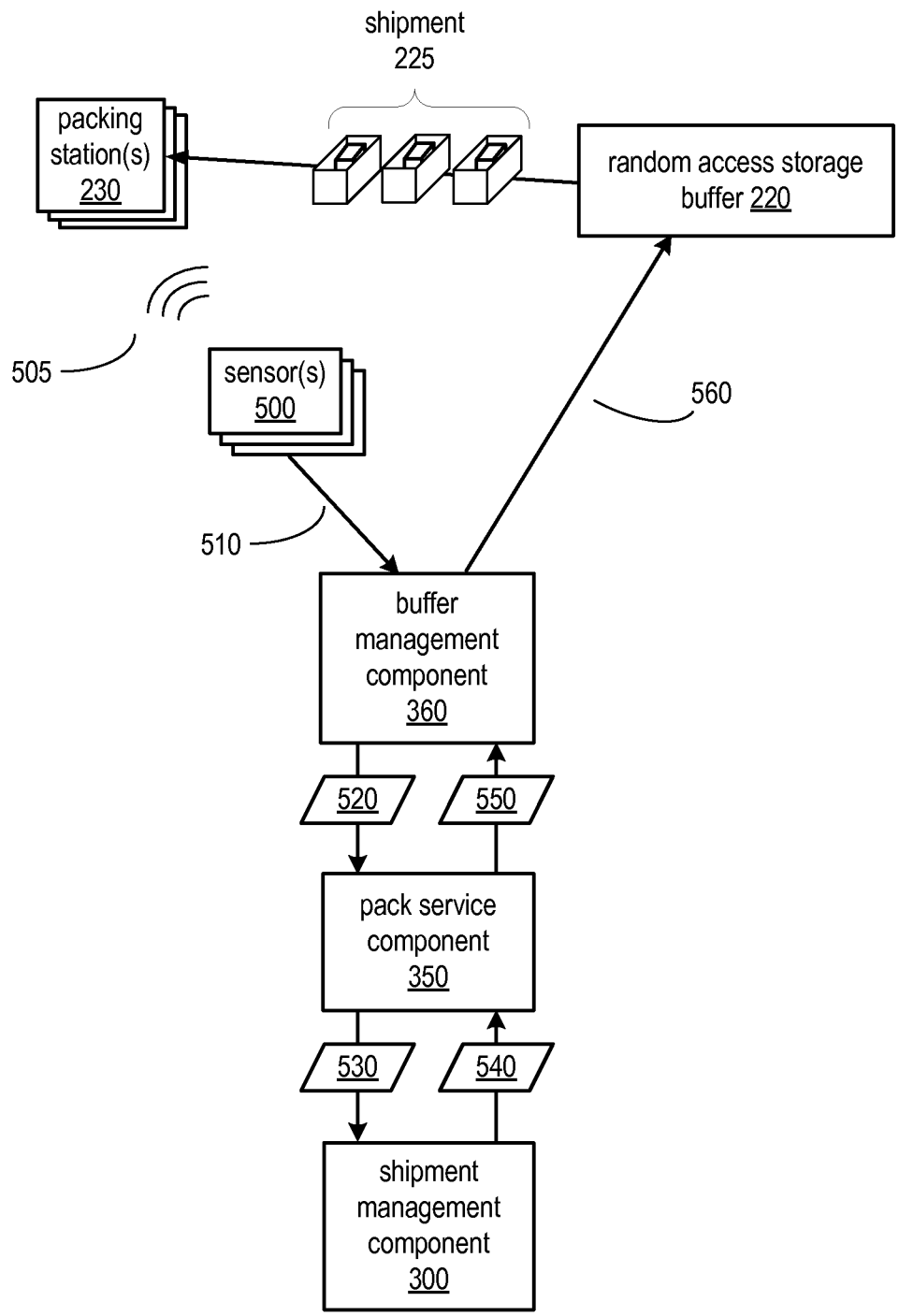
FIG. 5 illustrates an example flow diagram for the release of a shipment, according to some embodiments.

FIG. 5 illustrates an example process for determining that a pack station needs work items (e.g., shipments to pack), determining which work item(s) to provide to the pack station, and generating an instruction to provide the work item(s) to that pack station. As described in more detail below, the particular work item(s) chosen may be based on a variety of criteria.

In the illustrated embodiment, sensor(s) 500 may monitor the workload of each packing station. For instance, each pack station may include a queue or buffer where units released from random access storage buffer 220 accumulate. As a pack station (and/or the agent at that pack station) performs work, units may be removed from that station's queue. Sensor(s) 500 may monitor these queues as illustrated at 505 to determine whether the quantity of work within a pack station's queue has fallen below a threshold quantity (e.g., below a certain number of units or shipments). In response to determining that a particular packing station's work queue has fallen below such a threshold, sensor(s) 500 may generate a notification 510 and provide such notification to buffer management component 360. In one non-limiting example, a given sensor 500 may be a photo eye array.

In response to the notification 510, buffer management component 360 may notify pack service component 350 that a particular pack station (e.g., as identified by a pack station identifier) needs work, as illustrated by data 520. Pack service component 350 may determine the capabilities of that pack station. For example, as described above, different types of packing stations 230 may have different processing capabilities. For instance, one packing station may process only small shipments whereas other packing stations may process only medium or only large shipments. In various embodiments, pack service component 350 may generate and/or maintain a data store that includes records specifying the capabilities of each pack station 230. The pack service component may lookup a given pack station's capabilities from such a data store. Pack service component 350 may provide the identifier of the pack station that needs work as well as the capabilities of that pack station to shipment management component 300. In one non-limiting example, data 530 may specify an identifier of the pack station that needs work as well as an indication that specifies that pack station is capable of processing small and medium sized shipments (but not large shipments). Of course, in other examples, a pack station may have different capabilities.

In some embodiments, packing stations may have primary and secondary (or additional) packing station capabilities. For example, the primary packing station capability of a given packing station may include only large shipments. However, as a secondary packing capability, that same packing station may be additionally capable of processing medium shipments. In some embodiments, primary packing station capabilities may be preferred over secondary packing station capabilities. For example, due to configuration or personnel, a given packing station may be better suited to pack shipments of one type even though that packing station is capable of processing shipments of other types.

Shipment management component 300 may be configured to determine which shipment is to be released from random access storage buffer 220 and provide the identifier of that shipment to pack service component 350 as data 540. In various embodiments, shipment management component may determine a universe or domain of multiple shipments to evaluate; the shipment to release may be selected from this domain. For instance, in one non-limiting example, shipment management component 300 may constrain its analysis to shipments that are complete. In various embodiments, a complete shipment may be a shipment for which all units are present within the random access storage buffer 220. For example, the shipment management component may exclude shipments that are only partially complete, such as a shipment that has only some units present within random access storage buffer 220 (e.g., other units may still be in the picking process or otherwise have yet to be inducted into the buffer). In various embodiments, the universe or domain of complete shipments may be determined by shipment management component 300 by receiving such information from buffer management component 360 (e.g., the buffer contents can be determined from buffer model 370) and/or by receiving such information from control system 102 (e.g., the buffer contents may be determined from inventory model 320). In other embodiments, the shipment management component 300 may utilize other techniques for determining a list of shipments that are complete within random access storage buffer 220.

After determining the domain of shipments that are complete within random access storage buffer 220, shipment management component 300 may in some embodiments constrain the domain of shipments by eliminating some shipments from consideration on the basis of packing station capabilities. As described above, different packing stations 230 may have different capabilities. For instance, a packing station configured to process only small and medium shipments may not be configured to process large shipments. Shipment management component 300 may compare the shipments of the domain to the capabilities specified by data 530 and eliminate shipments that are not compatible with the specified capabilities. In one non-limiting example, the packing station specified by data 530 is capable of processing small and medium shipments, but not large shipments. In this example, shipment management component 300 may determine the shipment size for each shipment, which may be specified by pack service component 350, specified by some other component of the system, or inferred from product data 380, according to various embodiments. In this example, shipment management component 300 may then remove all shipments from the domain that do not have a size of small or medium (e.g., all large shipments are removed from consideration). The process described above may be referred to as reducing the domain.

As described above, in some cases, a packing station may have primary and secondary (or additional) packing capabilities. In the event that shipment management component 300 determines that no complete shipment is compatible with the primary packing capability of the packing station being evaluated, the shipment management component may identify completed shipments that are compatible with the secondary packing capability of that packing station. Consider an example where the packing station's primary capability is the packing of large shipments and the packing station's secondary capability is the packing of medium shipments. In this non-limiting example, if the completed shipments that are available do not include a large shipment, the shipment management component may identify completed medium shipments as being shipments eligible for consideration. In this way, the shipment management component may ensure that packing stations do not remain idle when shipments of their primary compatibility are not available. In various embodiments, this technique may improve the throughput of the overall packing process by increasing overall packing station utilization.

After reducing the domain of shipments being evaluated, the shipment management component may order or rank the remaining shipments of the domain according to one or more criteria. In various embodiments, the highest ranked shipment may be selected to be released from the random access storage buffer and provided to the respective pack station that needs work.

In some embodiments, the shipment management components may rank each shipment of the domain according to that shipment's expected shipping deadline, which may be the date and/or time at which that shipment is expected to be prepared for shipment from the materials handling facility. The shipment management components may generate the ranking such that shipments having a deadline closer to the current time are ranked higher than shipments having a deadline further away from the current time.

In some embodiments, the shipment management components may rank each shipment of the domain according to that shipment's priority value. Priority values may be utilized to differentiate among shipments with different service levels. For instance, at ordering time, a customer may request expedited shipping and/or handling of a shipment. This type of shipment may be given a higher priority value than a shipment with a basic service level. In one non-limiting example, shipments may be assigned one of sixteen different priority values. In various embodiments, the shipment management component may generate the ranking such that shipments having a higher priority value are ranked higher than shipments having a lower priority value.

In some embodiments, the shipment management components may rank each shipment of the domain according to quantity of units within that shipment. The shipment management components may generate the ranking such that shipments having more units are ranked higher than shipments having less units. For example, in various embodiments, biasing the ranking to favor shipments with larger quantities of units may create more room within random access storage buffer 220, which may in some cases have a fixed capacity.

In some embodiments, the shipment management components may rank each shipment of the domain according to the quantity of time that the shipment has resided in the random access storage buffer. The shipment management components may generate the ranking such that shipments that have resided in the buffer longer are ranked higher than shipments that have resided in the buffer for lesser quantities of time.

In various embodiments, the shipment management component may apply the criteria described above (e.g., shipping deadline, priority level, quantity of units, and quantity of time in the buffer) according to a layered or tie-breaking technique. For instance, the shipments in the domain may be evaluated by a first criterion and a second criterion may be utilized only to break a tie among shipments evaluated by the first criteria. Should the tie not be broken at this point, successive criteria may be utilized until the tie is broken. For instance, in one embodiment, the first criterion utilized may be the expected shipping deadline described above. If two shipments have the same expected shipping deadline, the shipment management component may be configured to break that tie by comparing those two shipments against a second criterion, such as priority level described above. Should the two shipments also have the same priority level, the shipment management component may break that tie by comparing the shipments to a third criterion, such as the quantity of units within the shipment. In the event that all criteria are exhausted and one or more shipments are still tied, the shipment management component may be configured to randomly or pseudo-randomly select the ranking of those shipments.

In some embodiments, instead of the tiered criteria approach described above where ties are broken based on a successive criterion, the shipment management component may be configured to, for each shipment, generate a composite score for that shipment based on multiple subscores and rank the shipments according to the composite scores. For instance, for a given shipment, the shipment management component may generate multiple subscores, each subscore corresponding to one of the criteria described above. For instance, one subscore may correspond to shipment deadline, another to a priority level, another to quantity of units, and so on. For a given shipment, the shipment management component may be configured to generate the composite score based on each subscore for that shipment. In one example, the shipment management component may sum the subscores to generate the composite score. In some cases, the shipment management component may be configured to generate the composite score as being a weighted sum of the different subscores where at least one subscore is weighted differently than other ones of the subscores. For example, the shipment management component may assign a heavier weight to a shipment deadline subscore relative to the weights given to subscores for other criteria. In the composite score example, the shipment management component may be configured to generate the ranking of the shipments based on composite score such that shipments with a larger composite score are ranked higher than shipments with lower composite scores.

In some embodiments, the shipment management component described herein may be configured to dynamically change the criteria and/or weighting of criteria over time or in response to certain events. For instance, in one embodiment, the shipment management component may be configured to determine that the utilization of the random access storage buffer (e.g., the quantity of units stored in the buffer) has reached a threshold. In response to that determination, the shipment management component may be configured to adjust the manner in which the shipment-related criteria described above are applied. In one non-limiting example, the shipment management component may change the criteria such that shipments with larger quantities of units are assigned a higher priority in the ranking of shipments relative to shipments with smaller quantities of units. In this way, the buffer utilization may be reduced to avoid processing slowdowns and/or gridlock within the materials handling facility.

In various embodiments, once the shipment ranking described above has been generated, the shipment management component may be configured to provide an indication of the particular shipment that is to be released from the random access storage buffer 220 as data 540, which is sent to pack service component 350. Pack service component 350 may pass this information back to buffer management component 360 as data 550. This information may represent an instruction to release the particular shipment from random access storage buffer 220. In response to this instruction, the buffer management component 360 may control the buffer (illustrated at 560) such that the buffer releases the specified shipment 225 to a respective one of packing stations 230.

As described above, the buffer management component 360 may store a release order within buffer model 370 (e.g., a release order generated according to FIG. 4A). When the buffer management component controls the random access storage buffer 220 at 560, the buffer management component may instruct the buffer to provide the shipment 225 to the respective packing station according to that release order. Note that, due to the manner in which buffer 220 handles units in some embodiments, the order in which units are released from the random access storage buffer may be, but need not be, the same as the order in which those same units arrive at a respective packing station.

Example Methods

Embodiments of the system and method for managing shipment release from a storage area of a materials handling facility may include various methods, such as those of FIGS. 6 and 7 described below. In various embodiments, these methods may be implemented on a computer system, such as that of FIG. 8 described below. In various embodiments, the methods described herein may be performed by shipment management component 300 described above, which may also be implemented on a computer system, such as that of FIG. 8 described below.

Figure 6:
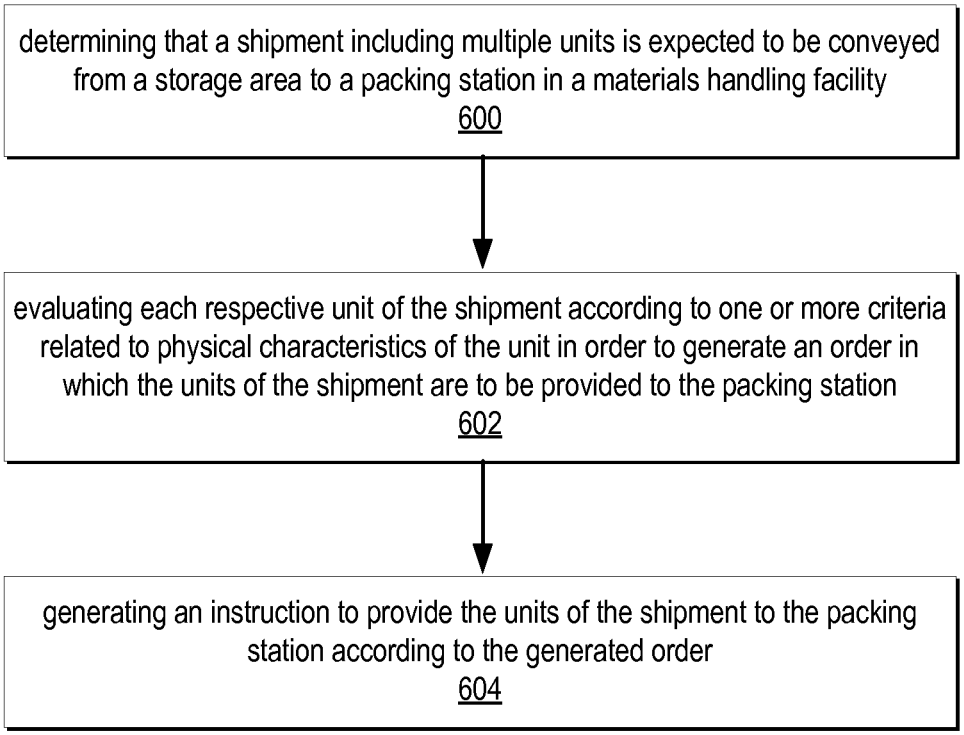
FIG. 6 illustrates a flowchart of an example method for generating and applying a release order for units of a shipment, according to some embodiments.

FIG. 6 illustrates a flowchart of an example method for determining and applying a release order for a particular shipment. As illustrated at block 600, the method may include determining that a shipment including multiple units is expected to be conveyed from a storage area to a packing station in a materials handling facility. For instance, this determination may include determining that a shipment has been inducted into a random access storage buffer (e.g., buffer 220) or that a shipment already resides in such a buffer. In general, any shipment to be handled by a random access storage buffer will at some point need to be release to a respective packing station (or otherwise be removed from the buffer).

As illustrated by block 602, the method may include evaluating each respective unit of the shipment according to one or more criteria related to physical characteristics of the unit in order to generate an order in which the units of the shipment are to be provided to the packing station, such as the release order described above. In various embodiments, this portion of the method may include applying any of the techniques described above with respect to FIG. 4A. For instance, the order may be generated such that units with larger footprints (e.g., product length multiplied by product width) are to be provided to the respective packing station prior to units with smaller footprints. In general, this portion of the method may include applying any technique described above with respect to the generation of a release order in FIG. 4A. As illustrated by block 602, the method may include generating an instruction to provide the units of the shipment to the packing station according to the generated order. Examples of such an instruction are illustrated as data 440 and 550 described above. For instance, such an instruction may include the initial notification of the release order provided to the buffer management component and/or the subsequent instruction to actually release the shipment.

Figure 7:
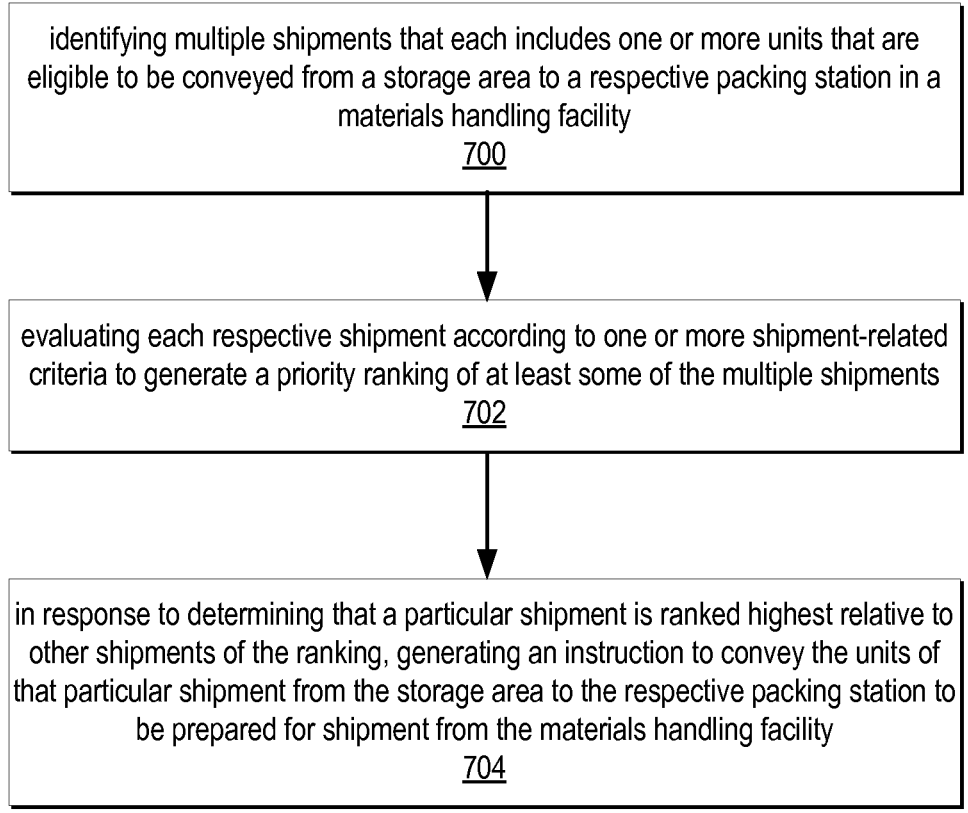
FIG. 7 illustrates a flowchart of an example method for selecting a particular shipment to be released from a storage area, according to some embodiments.

FIG. 7 illustrate a flowchart of an example method for selecting a particular shipment to be released from a storage area, according to some embodiments. One example of such a storage area is a random access storage buffer, such as buffer 220 described above. As illustrated by block 700, the method may include identifying multiple shipments that each includes one or more units that are eligible to be conveyed from a storage area to a respective packing station in a materials handling facility. In some embodiments, this portion of the method may include applying any of the techniques described above with respect to determining a domain or reduced domain of shipments, such as the techniques described above with respect to FIG. 5. For instance, block 700 may include determining the domain of shipments that are complete within the storage area (e.g., a random access storage buffer). As described above, a shipment may be complete if all units of the shipment are present within the random access storage buffer. In some embodiments, block 700 may also include reducing such a domain, such as eliminating shipments that are not compatible with the packing station that is to receive the shipment. Examples of this domain reduction process are described in more detail with respect to FIG. 5.

As illustrated by block 702, the method may also include evaluating each respective shipment according to one or more shipment-related criteria to generate a ranking of at least some of the multiple shipments. In some embodiments, at least one shipment-related criterion may be based on an expected shipping deadline for a given shipment. Other examples of criteria utilized to generate the ranking may include a priority level of the shipment, quantity of units in the shipment, and/or the quantity of time a shipment has resided within the storage area (e.g., within a random access storage buffer). In general, the method may include applying any of the techniques described above with respect to FIG. 5 in order to generate the ranking of shipments.

As illustrated by block 704, the method may include, in response to determining that a particular shipment is ranked highest relative to other shipments of the generated ranking, generating an instruction to convey the units of that particular shipment from the storage area (such as buffer 220) to the respective packing station (such as a packing station 230) to be prepared for shipment form the materials handling facility. Example of such an instruction include data 550 and instructions 560 described above.

Example Computer System

Various embodiments of the system and method for managing shipment release from a storage area in a materials handling facility, as described herein, may be executed on one or more computer systems, which may interact with various other devices. Note that any component, action, or functionality described above with respect to FIGS. 1-7 may be implemented via one or more computer systems configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 implementing shipment management component 300 are shown stored within program instructions 822. Additionally, data 832 of memory 820 may store any of the information or data structures described above, such as product data 370. In some embodiments, program instructions and/or data may be received, sent or stored upon different types of computer-accessible media or on similar media separate from system memory 820 or computer system 800. While computer system 800 is described as implementing the functionality of shipment management component 300, any of the components or systems illustrated above may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices (e.g., any other component of the Figures described above) attached to a network 885 (e.g., any element of FIG. 3) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement any element or action described above. In one embodiment, the program instructions may implement the methods described above, such as the methods illustrated by FIGS. 6-7. In other embodiments, different elements and data may be included. Note that data 832 may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computing system, comprising:
   a memory; and
   one or more processors coupled to the memory, wherein the memory comprises program instructions executable by the one or more processors to:
      identify multiple complete shipments of a plurality of shipments stored at a storage area that are eligible to be conveyed from the storage area to a respective packing station of a plurality of different of packing stations in a materials handling facility, wherein each shipment includes one or more units to be packed together in a same package, and wherein shipments are not identified as eligible until all units to be packed together for the shipment are present in the storage area such that fewer than all shipments stored at the storage area are determined to be eligible;
      determine a reduced domain portion of the eligible shipments, wherein to determine the reduced domain portion, the program instructions are configured to exclude each eligible shipment for which there is not at least one available packing station having a capability to pack that shipment from the eligible shipments, wherein at least some of the plurality of different packing stations have one or more packing capabilities not provided at one or more other packing stations of the plurality of packing stations;
      evaluate each respective shipment of the reduced domain portion of eligible shipments according to one or more shipment-related criteria to generate a ranking of at least some of the multiple shipments, wherein shipments at the storage area that are not part of the reduced domain portion of eligible shipments are not included in the ranking; and
      in response to determining that a particular shipment is ranked highest relative to other shipments of the ranking, generate an instruction to convey the one or more units of that particular shipment from the storage area to a respective packing station of the one or more packing stations to be prepared for shipment from the materials handling facility.

2. The computing system of claim 1, wherein said storage area includes a random access storage buffer comprising multiple locations at which units are stored.

3. The computing system of claim 1, wherein to exclude each eligible shipment for which there is not at least one available packing station having the capability to pack that shipment, the program instructions are configured to:
   determine that at least one available packing station is configured to pack shipments of one or more particular shipment sizes;
   enforce a restriction requiring that each respective shipment of the reduced portion of eligible shipments have a size compatible with said one or more particular shipment sizes.

4. The computing system of claim 1, wherein for each respective shipment, said one or more shipment-related criteria include one or more of:
   a priority level assigned to the respective shipment;
   a shipping deadline associated with the respective shipment;
   a quantity of units that are part of the respective shipment; and
   a quantity of time that the respective shipment has been located within the storage area.

5. The computing system of claim 1, wherein to generate said ranking, the program instructions are configured to:
   for each of at least some of said multiple shipments:
      generate a subscore for each of multiple shipment-related criteria, and
      generate a composite score based on each subscore;
   generate said ranking by ranking said multiple shipments according to the respective composite scores of the multiple shipments.

6. The computing system of claim 5, wherein each composite score for a given shipment is generated as the sum of the respective subscores for the given shipment.

7. The computing system of claim 6, wherein said sum of the respective subscores is a weighted sum, wherein at least one subscore is weighted differently than other subscores in the weighted sum.

8. The computing system of claim 1, wherein the program instruction are configured to:
   determine that the quantity of units stored in said storage area has reached a threshold quantity; and
   in response to that determination, change the shipment-related criteria utilized to evaluate each respective shipment such that shipments with larger quantities of units are assigned a higher position in said ranking than shipments with smaller quantities of units.

9. The computing system of claim 1, wherein the program instructions are configured to send the generated instruction to a computer system that controls the release of units from said storage area.

10. The computing system of claim 1, wherein to generate said ranking, the program instructions are configured to:
    generate a preliminary ranking of the shipments according to a first shipment related criterion; and
    utilize a second shipment criterion to break a tie among two or more shipments ranked equivalently in the preliminary ranking.

11. The computing system of claim 1, wherein the at least one packing station is associated with a primary packing station capability and a secondary packing station capability, wherein to determine the reduced domain portion of the eligible shipments, the program instructions are further configured to:

subsequent to determining that the at least one packing station is not configured to pack any shipments of a group of the multiple complete shipments based on the primary packing station capability associated with the at least one packing station, identify one or more shipments from the group of shipments that the at least one packing station is configured to pack based on the secondary packing station capability associated with the at least one packing station.

12. A computer-implemented method, comprising:

identifying multiple complete shipments of a plurality of shipments stored at a storage area that are eligible to be conveyed from the storage area to a respective packing station of a plurality of different of packing stations in a materials handling facility, wherein each shipment includes one or more units to be packed together in a same package, and wherein shipments are not identified as eligible until all units to be packed together for the shipment are present in the storage area such that fewer than all shipments stored at the storage area are determined to be eligible;

determining a reduced domain portion of the eligible shipments, wherein said determining comprises excluding each eligible shipment for which there is not at least one available packing station having a capability to pack that shipment from the eligible shipments, wherein at least some of the plurality of different packing stations have one or more packing capabilities not provided at one or more other packing stations of the plurality of packing stations;

evaluating each respective shipment of the reduced domain portion of eligible shipments according to one or more shipment-related criteria to generate a ranking of at least some of the multiple shipments, wherein shipments at the storage area that are not part of the reduced domain portion of eligible shipments are not included in the ranking; and in response to determining that a particular shipment is ranked highest relative to other shipments of the ranking, generating an instruction to convey the one or more units of that particular shipment from the storage area to a respective packing station of the one or more packing stations to be prepared for shipment from the materials handling facility.

13. The computer-implemented method of claim 12, wherein said storage area includes a random access storage buffer comprising multiple locations at which units are stored.

14. The computer-implemented method of claim 12, wherein said excluding each eligible shipment for which there is not at least one available packing station having the capability to pack that shipment comprises:

determining that at least one available packing station is configured to pack shipments of one or more particular shipment sizes;

enforcing a restriction requiring that each respective shipment of the reduced portion of eligible shipments have a size compatible with said one or more particular shipment sizes.

15. The computer-implemented method of claim 12, wherein for each respective shipment, said one or more shipment-related criteria include one or more of:

a priority level assigned to the respective shipment;

a shipping deadline associated with the respective shipment;

a quantity of units that are part of the respective shipment; and a quantity of time that the respective shipment has been located within the storage area.

16. The computer-implemented method of claim 12, wherein to generate said ranking, the method comprises:

for each of at least some of said multiple shipments:
generating a subscore for each of multiple shipment-related criteria, and
generating a composite score based on each subscore;
generating said ranking by ranking said multiple shipments according to the respective composite scores of the multiple shipments.

17. The computer-implemented method of claim 16, wherein each composite score for a given shipment is generated as the sum of the respective subscores for the given shipment.

18. The computer-implemented method of claim 17, wherein said sum of the respective subscores is a weighted sum, wherein at least one subscore is weighted differently than other subscores in the weighted sum.

19. The computer-implemented method of claim 12, wherein the method comprises:

determining that the quantity of units stored in said storage area has reached a threshold quantity; and in response to that determination, changing the shipment-related criteria utilized to evaluate each respective shipment such that shipments with larger quantities of units are assigned a higher position in said ranking than shipments with smaller quantities of units.

20. The computer-implemented method of claim 12, wherein the method comprises sending the generated instruction to a computer system that controls the release of units from said storage area.

21. The computer-implemented method of claim 12, wherein generating said ranking comprises:

generating a preliminary ranking of the shipments according to a first shipment related criterion; and utilizing a second shipment criterion to break a tie among two or more shipments ranked equivalently in the preliminary ranking.

22. The computer-implemented method of claim 12, wherein the at least one packing station is associated with a primary packing station capability and a secondary packing station capability, wherein said determining the reduced domain portion of the eligible shipments comprises:

subsequent to determining that the at least one packing station is not configured to pack any shipments of a group of the multiple complete shipments based on the primary packing station capability associated with the at least one packing station, identify one or more shipments from the group of shipments that the at least one packing station is configured to pack based on the secondary packing station capability associated with the at least one packing station.

23. A non-transitory, computer-readable storage medium, storing program instructions computer-executable on a computer system to:

identify multiple complete shipments of a plurality of shipments stored at a storage area that are eligible to be conveyed from the storage area to a respective packing station of a plurality of different of packing stations in a materials handling facility, wherein each shipment includes one or more units to be packed together in a same package, and wherein shipments are not identified as eligible until all units to be packed together for the shipment are present in the storage area such that fewer than all shipments stored at the storage area are determined to be eligible;

determine a reduced domain portion of the eligible shipments, wherein to determine the reduced domain portion the program instructions are configured to exclude each eligible shipment for which there is not at least one available packing station having a capability to pack that shipment from the eligible shipments, wherein at least some of the plurality of different packing stations have one or more packing capabilities not provided at one or more other packing stations of the plurality of packing stations;

evaluate each respective shipment of the reduced domain portion of eligible shipments according to one or more shipment-related criteria to generate a ranking of at least some of the multiple shipments, wherein shipments at the storage area that are not part of the reduced domain portion of eligible shipments are not included in the ranking; and in response to determining that a particular shipment is ranked highest relative to other shipments of the ranking, generate an instruction to convey the one or more units of that particular shipment from the storage area to a respective packing station of the one or more packing stations to be prepared for shipment from the materials handling facility.

24. The non-transitory, computer-readable storage medium of claim 23, wherein said storage area includes a random access storage buffer comprising multiple locations at which units are stored.

25. The non-transitory, computer-readable storage medium of claim 23, wherein to exclude each eligible shipment for which there is not at least one available packing station having the capability to pack that shipment, the program instructions are configured to:
determine that at least one available packing station is configured to pack shipments of one or more particular shipment sizes;
enforce a restriction requiring that each respective shipment of the reduced portion of eligible shipments have a size compatible with said one or more particular shipment sizes.

26. The non-transitory, computer-readable storage medium of claim 23, wherein for each respective shipment, said one or more shipment-related criteria include one or more of:
a priority level assigned to the respective shipment;
a shipping deadline associated with the respective shipment;
a quantity of units that are part of the respective shipment; and
a quantity of time that the respective shipment has been located within the storage area.

27. The non-transitory, computer-readable storage medium of claim 23, wherein to generate said ranking, the program instructions are configured to:
for each of at least some of said multiple shipments:
generate a subscore for each of multiple shipment-related criteria, and
generate a composite score based on each subscore;
generate said ranking by ranking said multiple shipments according to the respective composite scores of the multiple shipments.

28. The non-transitory, computer-readable storage medium of claim 27, wherein each composite score for a given shipment is generated as the sum of the respective subscores for the given shipment.

29. The non-transitory, computer-readable storage medium of claim 28, wherein said sum of the respective subscores is a weighted sum, wherein at least one subscore is weighted differently than other subscores in the weighted sum.

30. The non-transitory, computer-readable storage medium of claim 23, wherein the program instruction are configured to:
determine that the quantity of units stored in said storage area has reached a threshold quantity; and
in response to that determination, change the shipment-related criteria utilized to evaluate each respective shipment such that shipments with larger quantities of units are assigned a higher position in said ranking than shipments with smaller quantities of units.

31. The non-transitory, computer-readable storage medium of claim 23, wherein the program instructions are configured to send the generated instruction to a computer system that controls the release of units from said storage area.

32. The non-transitory, computer-readable storage medium of claim 23, wherein to generate said ranking, the program instructions are configured to:
generate a preliminary ranking of the shipments according to a first shipment related criterion; and
utilize a second shipment criterion to break a tie among two or more shipments ranked equivalently in the preliminary ranking.

33. The non-transitory, computer-readable storage medium of claim 23, wherein the respective packing station is associated with a primary packing station capability and a secondary packing station capability, wherein to determine the reduced domain portion of the eligible shipments, the program instructions are further configured to:
subsequent to determining that the at least one packing station is not configured to pack any shipments of a group of the multiple complete shipments based on the primary packing station capability associated with the at least one packing station, identify one or more shipments from the group of shipments that the at least one packing station is configured to pack based on the secondary packing station capability associated with the at least one packing station.

* * * * *